United States Patent [19]

Timmer

[11] 4,054,335
[45] Oct. 18, 1977

[54] CASTOR WHEEL

[75] Inventor: Hendrikus Jacobus Maria Timmer, Tiel, Netherlands

[73] Assignee: SKF Industrial Trading and Development Company B.V., Nieuwegein, Netherlands

[21] Appl. No.: 586,506

[22] Filed: June 12, 1975

[30] Foreign Application Priority Data

June 17, 1974 Netherlands .................... 7408023

[51] Int. Cl.$^2$ .................... F16C 33/76; A63C 17/22
[52] U.S. Cl. .................... 308/191; 301/5.3; 308/187.1
[58] Field of Search .................... 301/5.3, 5.7; 308/191, 308/192, 187.1

[56] References Cited

U.S. PATENT DOCUMENTS

| 882,846 | 3/1908 | Sachs | 308/191 |
|---|---|---|---|
| 3,309,155 | 3/1967 | Palmer | 308/191 |
| 3,594,051 | 7/1971 | Wells | 308/191 |

Primary Examiner—Richard A. Bertsch
Attorney, Agent, or Firm—Daniel M. Rosen

[57] ABSTRACT

In a wheel bearing assembly, a roller bearing is mounted within the hub of a wheel, with the outer race of the bearing being fitted in a hub of the wheel. A sealing ring is fitted in the hub. The sealing ring has an angular cross-section, with an axially extending portion engaging the bore of the hub, and a radially inwardly extending portion extending along the outer race. A fastening device, such as a cam surface, is provided on the axially extending portion of the sealing ring to enable fastening of a cap to the assembly. A portion of the radially inwardly extending portion of the sealing ring is axially displaced away from the outer race, so that the surface thereof away from the bearing may serve as a sealing surface engaging a further seal in use of the device.

11 Claims, 5 Drawing Figures

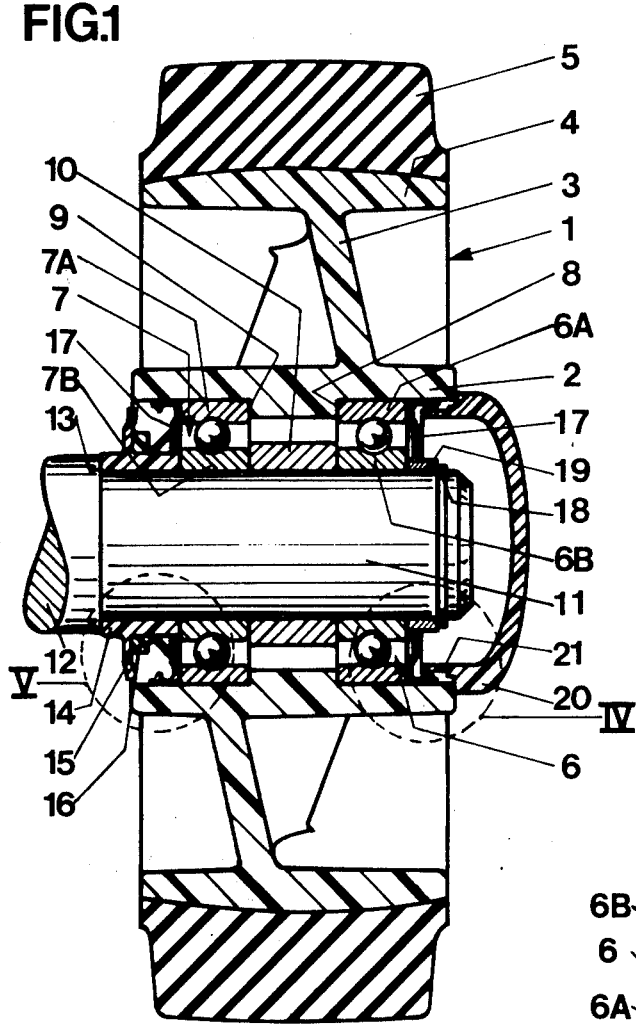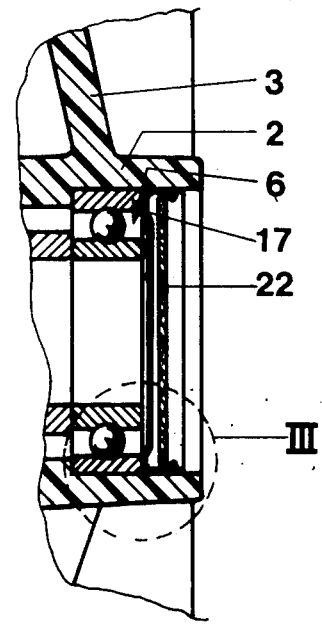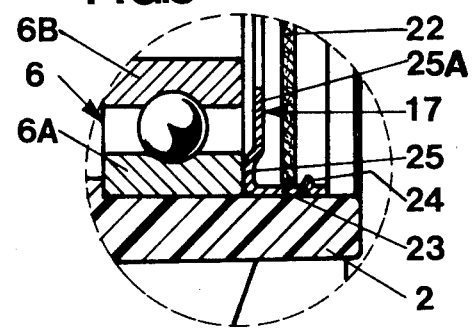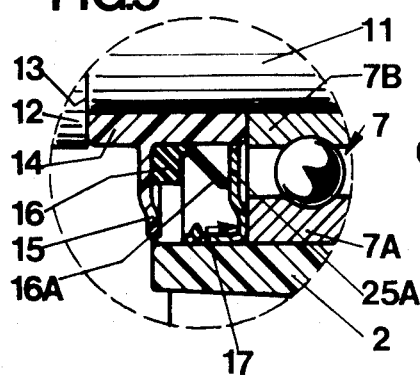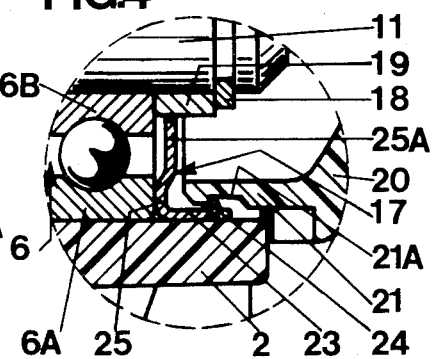

CASTOR WHEEL

THE INVENTION

The invention relates to a wheel having a hub comprising one or more lubricated rolling bearings and a sealing ring placed at the outside of one bearing, said ring having in cross-section a mainly angular shape, one edge being adjacent to the inside of the hub, while the other edge extends in a radial direction along the bearing ring side.

Such wheels are usually applied as so-called basic-wheels for swivel-wheel constructions; i.e. such a wheel-type being so proportioned that it can be used in several types of carrying structures, e.g. transport carts or wheeled hospital-beds.

The bearing of this wheel-type can be adapted in a relatively easy way to the shaft of the carrier. On the other hand as well developed normalization for this type of shaft has been realized. Other advantages of basic wheels lie in the fact that the so-called stock-value can remain low while the storage possibilities can be utilized to an optimum. Moreover these wheels can be shipped in standard packings, while the customers can maintain a flexible supply-system. The above wheel-type comprises a hub with two rolling bearings of the deep-groove ball-bearing type which allow a relatively greater load on the bearing with slight friction and an almost noiseless rotation. Apart from its greater capacity a characteristic feature of such a bearing compared e.g. with a sliding bearing is the almost noiseless rotation of the wheel in which the bearing is mounted, which is of great importance, particularly when smooth and quiet running are required, e.g. in hospitals. Essential for well functioning of such a wheel under all conditions is the sealing of the bearing which prevents the lubricant from leaking out of the bearing and accumulating e.g. in a space formed by a closing cap and the hub. Therefore this type of bearing has been provided with a specific sealing element, having mainly the shape of a ring which in accordance with wheel-catalogues may have different forms.

The invention provides an improved wheel of the above type for which, in particular, the function of the sealing ring has been improved. For that purpose the sealing ring according to the invention comprises fastening means for a closing cap of the hub and besides a contact surface for a sealing means, such as a V-ring mounted outside the bearing itself or on the shaft of said wheel. By this measure the reliability and life of this improved wheel-type is efficiently increased even under diverse conditions e.g. in adverse environment (chemical workshops).

A preferable embodiment according to the invention is characterized in that an edge of the sealing ring supported against the hub has a number of cams forming the fastening means for a closing cap. Favourable also is the embodiment which is characterized in that according to the cross-section a part of the ring-edge which is supported against the outer race-ring-side has a bent part which extends into a radially extending part, forming a contact surface for a sealing element, such as a V-ring, mounted on the shaft, and also forming a simple labyrinth sealing for the bearing.

Embodiments of the invention will now be described by way of examples, with reference to the accompanying drawing, in which FIG. 1 is a cross-sectional view of a wheel according to the invention;

FIG. 2 is a cross-sectional view of a part of the hub, which has been provided with a closing cap;

FIGS. 3, 4 and 5 are enlarged scale details of the wheel as encircled by the dashed circles III, IV and V respectively in FIGS. 1 and 2.

As shown in FIG. 1 the wheel 1 comprises a hub 2 with a unified closed spoke construction 3, having a rim 4 of about the same breadth as the hub 2. The rim 4 is provided with a flexible wearproof layer 5 of synthetic material. The wheel 1 also is made of a suitable synthetic material, whereby, the spoke construction 3 provides for a balanced transmitted load distribution. The hub 2 according to this embodiment comprises two bearings 6 and 7 of the deep-groove ball-bearing-type, which can be efficiently subjected axial as well as radial loads. These bearings are normally lubricated with grease, and assuming there is a good sealing, the lubrication will be sufficient for the set life of the bearing. The bearings 6 and 7 with their race rings 6A and 7A are mounted into the hub 2 and supported laterally by collars 8 and 9 of the hub 2. Further, a distance ring 10 is positioned between the race rings 6B and 7B to prevent, among other things, a part of the hub 2 from being side-loaded too much and pushed off. The bearing 6 and 7 are pressure fit on the stub 11 of shaft 12. The shaft 12 comprises a collar 13. Between the race ring 7B and the collar 13 there is mounted a distance ring 14 made of synthetic material and having an edge 15, against which a V-ring 16 is supported. In the hub 2 and against the outside race ring 7A a flexible rustproof sealing ring 17 is positioned, having several functions which will be explained further. At the right side of FIG. 1 a sealing ring 17 is shown which is mounted in the hub and against the race ring 6A of bearing 6 in the same manner as against the bearing 7. Between the race ring 6B and a washer 18, for instance a Seger-ring, a distance ring 19 is mounted, by which the fixed position of bearing 6 on the shaft 11 has been realized. Outside, the hub 2 further is closed by a cap 20 the brim 2 of cap 20 fitting into the sealing ring 17 in a specific way.

FIG. 2, shows a part of the hub 2 with the bearing 6. Instead of a cap 20 (see FIG. 1) the bearing is closed from the outside by means of a circular disc 22, made preferably of - at least in the axial direction - easily impressable material, for instance cardboard. The disc 22 has been clamped at its circumference in a sealing ring 17, which clamping will be explained further with FIG. 3. A disc of this design has the advantage on the one hand that, especially during transport, the wheels with their hubs can be stacked against or on each other, and on the other hand the penetration of dirt, moisture or the like can be prevented on a relatively simple way. There is yet another advantage, namely that data can be noted on the disc, for instance wheel- or bearing-size information, elucidating directly the wheel's possibilities for applications. Removing the disc from the hub can be realized in a simple way, namely by pressing the centre of this disc, by which clamping in the sealing ring 17 is released and whereupon the pressed disc 22, now having a conical shape, can be easily removed from the hub 2.

FIG. 3 shows in detail and on an enlarged scale the fastening of the cardboard disc 22, here moreover, the shape of the sealing ring 17 is shown in a clear way. The preferable shape of this ring being mainly rectangular, and provided with an edge part 23, placed in or against the inside surface of hub 2, for instance by pressing. According to the invention the sealing ring 17 has at its edge cam-like means 24, serving as fastening means for hub sealing- and closing-elements. The other edge-part 25 of the ring 17, lying against the outer race ring 6A extends with a slight bend into a radially directed part 25A, which part extends nearly to the center of the inner race ring 6B. Between part 25A of the sealing ring 17 and the cams 24, situated at equal distances on the circumference of edge-part 23, the circular cardboard disc 22 is mounted. The disc now being flexible enough to be mounted inside the ring 17 by shoving it with a slight pressure at the circumference over the cams 24 without being damaged. On the other hand the thickness of the disc 22 is such, that if the disc has to be removed, it can be conically deformed by an axial impression, for instance with a thumb of the hand, and may therefore be removed easily from the hub. Moreover, the edge-part 25A of ring 17 is a good lateral support for the disc 22, during transport as well as for storage.

FIG. 4 shows in detail the fastening of a closing- or protecting cap 20 on the hub 2 (see also FIG. 1). In accordance with FIG. 4 a distance-tube or ring 19 has been placed between the inner race ring 6B and a stopping ring, such as annular clip 18. Against the outer race ring 6A further the bent part 25 of ring 17 lies, of which the radially directed part 25A extends close to the ring 19. In this way ring 17 forms a simple labyrinth sealing for the bearing, realizing, as appears from practice, an efficient sealing. The edge-part 23 of the sealing ring 17, provided with fastening means, respectively cam-like elements 24, is particularly suited now for holding a protection cap 20. For that purpose this cap has a thinner part 21, provided with an annular notch 21A with the help of which the part 21 the cap 20 can be placed over the cams 24 under influence of a slight pressure. In this way the sealing ring 17 also forms a fastening element for the cap 20, respectively the disc 22, which is maintained now under a very slight strain in the hub 2, actually in the ring 17; this in contrast with the known designs, where the cap 20 is fixed in the hub with great frictional forces.

FIG. 5 shows an enlarged section of a detail, such as is represented at the left side of FIG. 1. The ball-bearing 7 is at its outer side provided with the sealing ring 17, hereto actually outside the bearing itself, so between the inner race ring 7B and the collar 13 of the axle 12, a distance ring 14 has been mounted. The ring 15 of this tube 14, extending radially serves here as a fastening element for a V-ring 16, of which now the circular sealing lip 16A is supported against the flat edgepart 25A of the ring 17. In this way an efficient sealing of the bearing is obtained in a relatively simple manner with the help of a sealing 16 mounted on the shaft side.

Thus a wheel of the present type has been improved by the invention, so that the sealing ring now can fulfill more functions as compared with the known wheel-designs, and where its extra functions, namely its application as sealing and fastening means, are realized in a relatively simple way.

I claim:

1. In a wheel having a hub, at least one rolling bearing mounted in said hub, a sealing ring in said hub at the side of said bearing, said ring having an angular cross-section, a first portion of which extends into contact with said hub and a second portion of which extends radially of the hub along said side of said bearing; the improvement wherein said sealing ring further comprises fastening means formed on a side thereof away from said bearing, for enabling the fastening of cap a to said sealing ring, and a radially extending contact surface on the side thereof away from said bearing for contacting sealing means for said bearing.

2. The wheel of claim 1 wherein said fastening means comprises cam means on an edge of said sealing ring adjacent said first portion thereof.

3. The wheel of claim 1 wherein said second portion of said sealing ring engages said bearing, said contact surface comprising a radially inwardly extending portion joined at its radially outer edge to said second portion by a bent portion, whereby said radially inwardly extending portion is axially spaced from said bearing.

4. The wheel of claim 1 wherein said sealing ring is formed of a flexible rustproof material, and is pressed into said hub.

5. The wheel of claim 1 further comprising a flat substantially circular impressible disc positioned between said fastening means and said radially extending contact surface.

6. The wheel of claim 1 further comprising a flexible cap having a snap brim, said brim releasibly engaging said fastening means.

7. A wheel having a hub, a bearing positioned in said hub and having an outer race radially engaging said hub, and an annular sealing ring of angular cross-section having a first portion radially engaging said hub, a second portion extending radially along and engaging a side of said outer race, a radially extending contact surface portion axially spaced from said bearing, a bent portion join the radially inner end of said second portion and the radially outer edge of said contact surface portion, and a cam portion extending radially inwardly from said first portion at a location thereof axially outwardly of said second portion, with respect to said bearing.

8. The wheel of claim 7 further comprising a flat flexible circular closing cap extending in a plane between said contact surface and said cam portion.

9. The wheel of claim 7 further comprising a flexible closing cap having an axially extending annular brim with an annular outer groove therein, said groove engaging said cam portion.

10. The wheel of claim 7 further comprising a shaft, said bearing having an inner race mounted on said shaft, and further comprising sealing means on said shaft and extending into sealing contact with said contact surface.

11. The wheel of claim 7 further comprising a shaft, said bearing having an inner race mounted on said shaft, a spacing ring on said shaft engaging a side of said inner race radially aligned with said side of said outer race, said contact surface having a radially inner edge adjacent said spacing ring.

* * * * *